(12) United States Patent
Gabriel

(10) Patent No.: US 10,031,536 B2
(45) Date of Patent: Jul. 24, 2018

(54) DRIFT CURRENT COULOMBIC STORAGE APPARATUS

(71) Applicant: GABRIEL PATENT TECHNOLOGIES, LLC, Poulsbo, WA (US)

(72) Inventor: Caelin Gabriel, Poulsbo, WA (US)

(73) Assignee: Gabriel Patent Technologies, LLC, Poulsbo, WA (US)

( * ) Notice: Subject to any disclaimer, the term of this patent is extended or adjusted under 35 U.S.C. 154(b) by 0 days.

(21) Appl. No.: 15/398,653

(22) Filed: Jan. 4, 2017

(65) Prior Publication Data

US 2017/0194874 A1 Jul. 6, 2017

Related U.S. Application Data

(60) Provisional application No. 62/274,760, filed on Jan. 4, 2016.

(51) Int. Cl.
*G05F 1/12* (2006.01)
*H02M 7/04* (2006.01)

(52) U.S. Cl.
CPC ............... *G05F 1/12* (2013.01); *H02M 7/04* (2013.01)

(58) Field of Classification Search
CPC ...... H02M 1/425; H02M 1/4226; H02M 7/02; H02M 7/26; H02M 7/28; H02M 7/04; G05F 1/12; G05F 1/625–1/656
See application file for complete search history.

(56) References Cited

U.S. PATENT DOCUMENTS

| | | | | |
|---|---|---|---|---|
| 3,675,120 A | * | 7/1972 | Fathauer | G01N 27/223 324/666 |
| 3,988,215 A | * | 10/1976 | Scherr, III | C25D 11/02 204/206 |
| 2003/0201672 A1 | | 10/2003 | Stranberg et al. | |
| 2006/0262881 A1 | | 11/2006 | Cern | |
| 2007/0200432 A1 | | 8/2007 | Yano et al. | |
| 2008/0043387 A1 | | 2/2008 | Weil | |
| 2010/0061509 A1 | * | 3/2010 | D'Ambrosio | A61B 6/10 378/62 |
| 2015/0364882 A1 | | 12/2015 | Roy et al. | |
| 2016/0205733 A1 | * | 7/2016 | Chen | H05B 33/0815 315/201 |

* cited by examiner

*Primary Examiner* — Kyle J Moody
*Assistant Examiner* — Peter Novak
(74) *Attorney, Agent, or Firm* — Craig M. Stainbrook; Stainbrook & Stainbrook, LLP

(57) ABSTRACT

A circuit for improving instantaneous current flow in an AC-to-DC power supply for an electronic device, said circuit positioned immediately prior to an AC input for the AC-to-DC power supply and providing a reserve of electrical charge independent of the inductive impedance of the AC power line.

14 Claims, 2 Drawing Sheets

DRIFT CURRENT COULOMBIC STORAGE APPARATUS

CROSS REFERENCES TO RELATED APPLICATIONS

The present application claims the benefit of U.S. Provisional Patent Application Ser. No. 62/274,760, filed Jan. 4, 2016 (Jan. 4, 2016), which is incorporated in its entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INSTANT INVENTION

Field of the Instant Invention

The present invention relates most generally to power supplies for professional and consumer electronic devices, and more particularly to a circuit or circuit stage to improve power supply efficiency and reliability, and still more particularly to a device to improve instantaneous current flow into an AC/DC power supply commonly used in consumer electronic devices.

Background Discussion

It is well understood that an AC electromagnetic wave propagates through a metal conductor at velocities ranging between 60 to 90 percent of the speed of light. What is less well known (at least less well appreciated by lay persons) is that the current —specifically the individual charge carriers (i.e., the electrons)—do not move (or drift) at anywhere near that speed. In physics this phenomenon is referred to as drift current. Although the electromagnetic wave propagates at fractional light speeds, the drift current propagates at speeds of millimeters per second or less, depending upon the specific peak voltage, total circuit impedance, and the power line frequency.

In a typical power supply for an electronic device, the power supply draws current from the power line in pulses. Current is only drawn at the positive and negative peaks of the AC voltage waveform. The storage capacitors for the power supply maintain a relatively stable DC voltage, and the rectification diodes only turn on when the AC waveform voltage exceeds the stored voltage level in the capacitor array. When the rectification diodes do turn on there is high surge of current drawn from the AC power line. The sudden demand for instantaneous current from the power supply can exceed the capacity of the power line to deliver current efficiently due to inductive reactance and simple resistance of the line. The inductance of the power line conductors will cause a significant rise in impedance to the change of instantaneous current when the power supply rectifiers switch on. This pulsating current draw creates high order voltage and current harmonics, which, in turn, create distortion harmonics as high as the 50th harmonic of the power line frequency.

In large power distribution systems this problem causes a "power factor" degradation. The voltage phase leads the current phase, which reduces the effective power delivery to the load or power supply. A common solution applied to the power factor problem is to install large arrays of storage capacitors on the AC power line. Disadvantageously, these are large, heavy, generate heat, and have a relatively short "mean time between failure" rate.

What is needed is a solution that stores energy "locally", near the power supply. Such as solution should allow the power supply to draw current pulses at a rate higher than would normally be allowed by the inductive reactance of the power line.

BRIEF SUMMARY OF THE INVENTION

The present instant invention improves the performance of consumer and professional electronics designed for audio and video production or reproduction. The apparatus also has beneficial applications for scientific and medical devices that detect low level signals and render them as a visual image on a computer monitor, projector or 3D goggles. The apparatus specifically improves the performance of the power supplies commonly used in consumer electronic devices. These power supplies specifically convert AC (alternating current) power to DC (direct current) power voltages.

Embodiments of the present invention take advantage of the slow velocity of electron drift by providing a relatively large conductive volume that provides a space to store a "compressed" charge of electrons. Because power supplies pull current in instantaneous pulses, and because the inventive device is positioned very near the power supply, it is able to supply a reserve of electrical charge independent of the inductive impedance of the AC power line. This objective is achieved because the inventive circuit provides a local reserve of power in the form of "electric charge" or Coulomb charge. It mitigates the inductive reactance of the AC power line. When placed near a power supply, the apparatus acts as an instantaneous current reserve. Its operation can be described as analogous to that of a reserve ballast air tank in a compressed air system: instead of storing compressed air locally, the apparatus stores an electrical charge that can be delivered upon demand from the power supply.

Note should be made that the inventive circuit operates only in a power system where current is drawn in pulses. It has no advantageous effect in a system where current draw is linear across the entire AC waveform.

In the power supply, when the rectifiers switch on, their impedance drops to less than 0.1 ohms. This creates a dramatic increase in current draw from the AC power line. However, the inductive reactance of the AC power line resists this instantaneous draw of current that impedes the effective flow of current flow to the power supply.

The inventive apparatus is positioned at the AC input to the power supply. The apparatus is most effective when placed as near to the rectifiers as possible.

As the AC voltage waveform rises in voltage with the rectifiers off, an electric charge is formed within the apparatus. As the AC voltage nears its peak, the rectifiers turn on when they have exceeded the voltage level in the storage capacitor array. When this occurs, the AC line impedance resists the sudden change in current, thereby creating a high source impedance to the power supply. However, the stored electric charge within the apparatus is released and delivers a momentary power boost.

The apparatus has some of the advantages of a storage capacitor and some of a series inductor without the corresponding disadvantages. Specifically, it can store small amounts of reserve charge in the manner of a series inductor, yet like a storage capacitor it responds to changes in current flow almost instantaneously.

The apparatus stores energy in the form of a coulomb charge, in a manner similar to how a capacitor functions. However, unlike a capacitor the apparatus has virtually no current flow through it. The apparatus is specifically designed to have a very high series resistance, on the order of three to six Giga ohms. Further, the apparatus does not store voltage as a capacitor does.

Also unlike a capacitor, in embodiments the conductive strips used in the inventive apparatus are not placed in close proximity to one another. Further, the electric charge is not stored in an intermediary dielectric material. Rather, the coloumb charge is stored entirely within the conductive strips themselves, in the form of compressed electrons. As used herein, "compressed electrons" means that the there is a relative electric charge present from one end of the conductive strip to the other end such that the electrons behave within groups or domains of electron charge.

Unlike an inductor, the inventive apparatus does not resist a change in instantaneous current flow. Rather, it improves instantaneous current flow. In essence, the apparatus may be considered a unique type of basic electronic circuit component in that it operates entirely differently from either a capacitor or an inductor.

The principle of operation requires further study, but there is evidence that the apparatus functions based upon the principles associated with drift current and not necessarily electromagnetic wave propagation.

BRIEF DESCRIPTION OF SEVERAL VIEWS OF THE DRAWINGS

The instant invention will be better understood and objects other than those set forth above will become apparent when consideration is given to the following detailed description thereof. Such description makes reference to the annexed drawings wherein.

DETAILED DESCRIPTION OF THE INSTANT INVENTION

Figure 1:
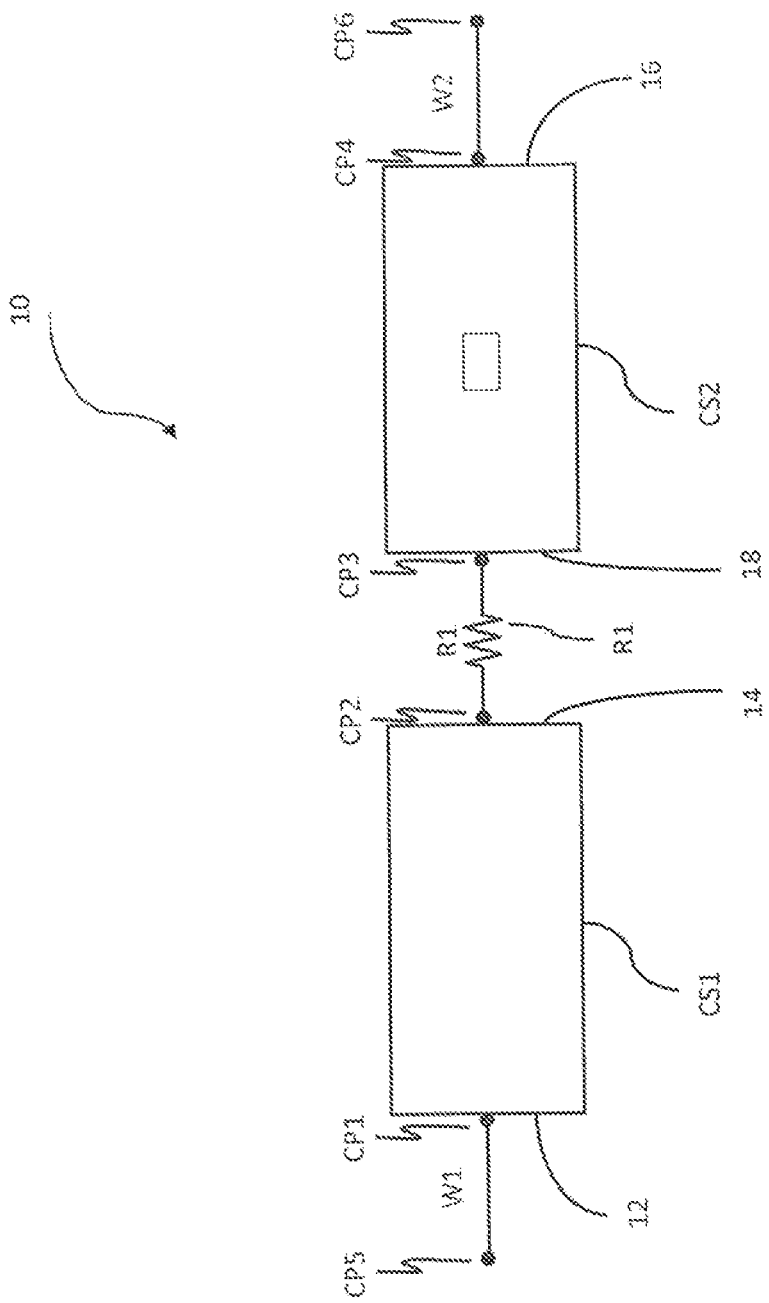
FIG. 1 is a schematic diagram of an embodiment of the inventive circuit for improving the instantaneous current flow into an AC-to-DC power supply.
Figure 2:
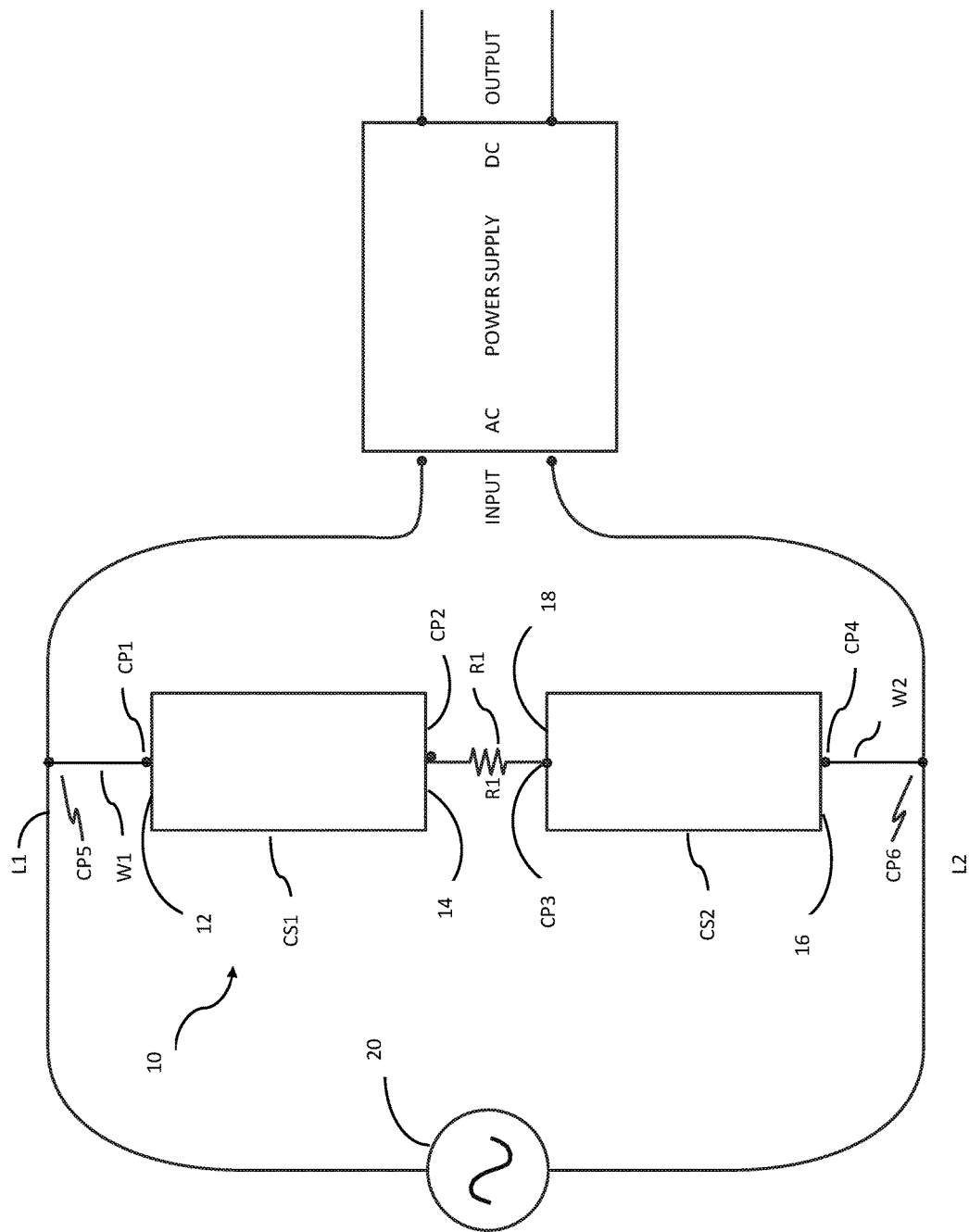
FIG. 2 is as schematic diagram showing the inventive circuit incorporated in an AC to DC power supply for an electronics device.

Referring to FIG. 1 and FIG. 2, it will be seen that in an embodiment, the inventive apparatus 10 consists of first and second conductive strips (foils or very thin plates), CS1 and CS2, respectively, connected in series with a resistor R1 disposed between them.

FIG. 1 shows that in an embodiment, a first conductive wire W1 is connected at connection point CP1 at a first end 12 of the first conductive strip CS1. The first conductive strip CS1 is connected at its second end 14 in series with resistor R1 at connection point CP2. Resistor R1 is connected in series to the second end 18 of second conductive CS2 strip at connection point CP3. The second conductive strip CS2 is connected in series at its second end 16 with a second conductive wire W2 at connection point CP4.

The first conductive strip CS1 is bonded at its first end 12 to wire W1. The second conductive strip CS2 is bonded at its first end 16 to wire W2. The first conductive strip is connected in series with the resistor R1 at the second end 14 of the first conductive strip CS1. The second conductive strip CS2 is connected at its second end 18 to resistor R1.

The apparatus elements are connected in series in the following order: W1 is connected to conductive strip S1. S1 is connected to resistor R1. R1 is connected to conductive strip S2. S2 is connected to wire W2.

Referring next to FIG. 2, there is shown an embodiment of the apparatus coupled to an AC power supply circuit. The apparatus connects to an AC power line at or before the input of an AC-to-DC power supply. The apparatus is connected across the two AC power conductors L1 (hot) and L2 (neutral) in parallel to the input of the power supply 20. The first wire W1 is connected to the power line conductor L1 at connection point CP5. The second wire W2 is connected to the second power line conductor L2 at connection point CP6.

An alternate method of connection to the AC power line is to eliminate the connecting wires W1 and W2. The conductive strips may be connected directly to the AC power line conductors at connection points CP1 and CP4. The construction and operation of the apparatus is unaffected with this method.

The conductive strips must be constructed with very specific dimensions and properties for the apparatus to function properly. The conductive strips may be made from a variety of conductive materials that include but are not limited to copper, silver, gold, brass, aluminum or any other conductive material. The conductive strips may be in the form of a rigid flat plate but the preferred implementation is a flexible conductive foil material, such as a length of copper foil.

The thickness of the copper foil is important for optimal performance of the apparatus. Extensive experimentation indicates that a foil of at least 1-6 millimeters in thickness is desired. The physical dimensions of length and width of the conductive strips are critical to proper operation of the apparatus. A width of less than 2 inches and a length of only 2 inches is adequate to achieve proper operation. However, optimal performance can be achieved only by using much larger conductive strips. Experiments indicate that a width of 9 inches and a length of 10 feet provide optimal performance. Because these dimensions are much too unwieldy for packaging purposes, the conductive strips may be rolled into cylindrical shapes. This necessitates that the conductive strip have a non-conductive layer on one side such that when rolled there is a dielectric layer between the wound conductive layers to prevent conduction from one layer of the cylinder to the next. Each of the first and second conductive strips may be rolled into a cylindrical shape, but they cannot be rolled together. This would create a type of capacitor and would undermine the proper operation of the apparatus.

In an embodiment, optimal dimensions of the conductive strips are determined by the maximum peak voltage of the AC power line that the apparatus will be connected to and the frequency of the AC power line signal. The dimensions described are optimal for a typical US power line voltage operating at 120 VAC at a frequency of 60 Hz. If the voltage or frequency is different than the dimensions of the conductive strips must be recalculated and adjusted for optimal performance.

Proper functioning of the apparatus also depends on proper resistor value selection for resistor R1. First, the resistor is necessary to complete a circuit between the two power line conductors L1 and L2. If the resistor is of too low a value, then the apparatus would simply function as a parallel current path to the power supply and would have no beneficial effect. Experiments have determined that a resistor value of less than 100 kilo-ohms is insufficient for effective operation. The resistor must be selected to ensure the absolute minimal current flow through the conductive strips CS1 and CS2. A resistor value too low would allow current to flow through conductive strips effectively negating the desired electric charge compression effect. Conversely, if the value of the resistor is too high, the connection between the conductive strips CS1 and CS2 would effectively act as an open circuit rendering the apparatus inoperable.

Experimentation demonstrates that for an AC power line of 120 VAC at 60 Hz, the value should be at minimum 100 kilo-ohms while the ideal value would be approximately 3 giga-ohms. As the value of the resistor approaches 6-10 giga-ohms the apparatus becomes ineffective or non-operational. For an AC power line of 240 VAC at 50 Hz, the value should be at minimum 100 kilo-ohms while the ideal value would be approximately 5 giga-ohms. As the value of the resistor approaches 10-20 giga-ohms the apparatus becomes ineffective or non-operational.

What is claimed as instant invention is:

1. A circuit device to improve instantaneous current flow in an AC-to-DC power supply for an electronic device, comprising:
   a first conductive strip for storing an electric charge, said first conductive strip having a first end with a connection point for connecting to a hot power line conductor and a second end connected to a resistor; and
   a second conductive strip for storing an electric charge, said second conductive strip having a first end with a connection point for connecting to a neutral power line conductor and a second end connected to said resistor such that said resistor is disposed between said first conductive strip and said second conductive strip;
   wherein each of said first and second conductive strips are configured and spaced apart so as to store the electric charge entirely within said first and second conductive strips and not within dielectric material disposed between said first and second conductive strips, and further wherein said first and second conductor strips do not discharge across a dielectric material;
   wherein said resistor value is selected to be high enough to minimize current flow through said first and second conductive strips and low enough to prevent the connection between said first and second conductive strips to act as an open circuit; and
   wherein said circuit device does not resist an instantaneous change in current flow.

2. The circuit device of claim 1, wherein each of said first and second conductive strips is at least 1 millimeter in thickness.

3. The circuit device of claim 1, wherein each of said first and second conductive strips is elongate, at least 2 inches in width, at least 2 inches in length, and has a thickness of at least 1 millimeter.

4. The circuit device of claim 3, wherein said conductive strips are rigid planar plates.

5. The circuit device of claim 3, wherein said conductive strips are flexible conductive foils.

6. The circuit device of claim 3, wherein each of said first and second conductive strips has a width of approximately 9 inches and a length of approximately 10 feet.

7. The circuit device of claim 6, wherein said first and second conductive strips are rolled into cylinders and include a dielectric layer disposed atop a conductive layer, such that the surfaces of the conductive layer does not come into contact with one another.

8. The circuit device of claim 1, further including a first wire connected to said first end of said first conductive strip and a second wire connected to said first end of said second conductive strip.

9. The circuit device of claim 8, wherein said resistor has a value of at least 100 kilo-ohms.

10. The circuit device of claim 1, wherein said resistor has a value of at least 100 kilo-ohms.

11. The circuit device of claim 1, further including an AC-to-DC power supply coupled at its input end to said circuit device across a hot AC power conductors and a neutral AC power conductor.

12. The circuit device of claim 11, wherein said AC-to-DC power supply is directly connected to said first and second conductive strips at their respective first ends.

13. The circuit device of claim 1, wherein said first and second conductive strips are fabricated from conductive metal selected from the group consisting of copper, silver, gold, brass, and aluminum.

14. The circuit device of claim 1, wherein said resistor has a value sufficient only for minimal current flow through said first and second conductive strips so as to create a local reserve of power in said first and second conductive strips.

* * * * *